Figure 1:
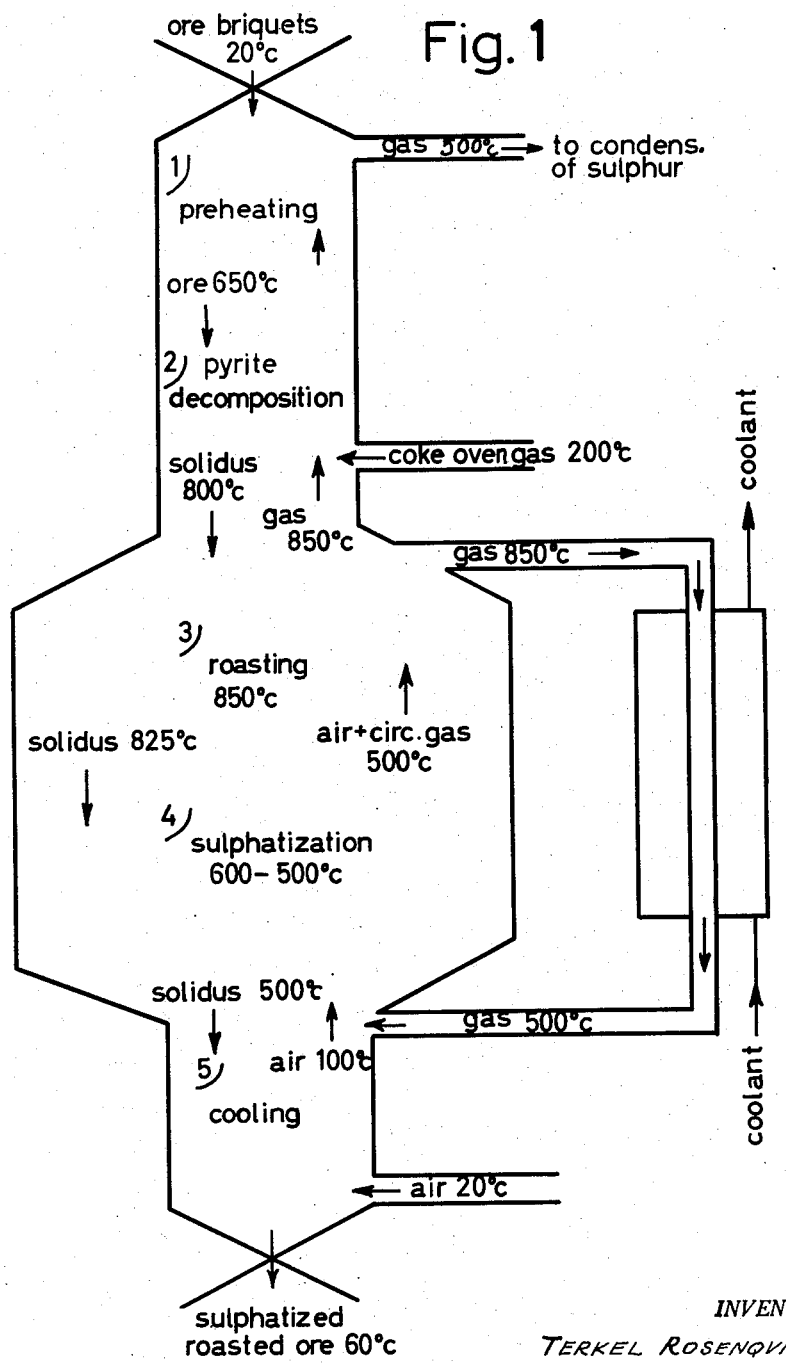

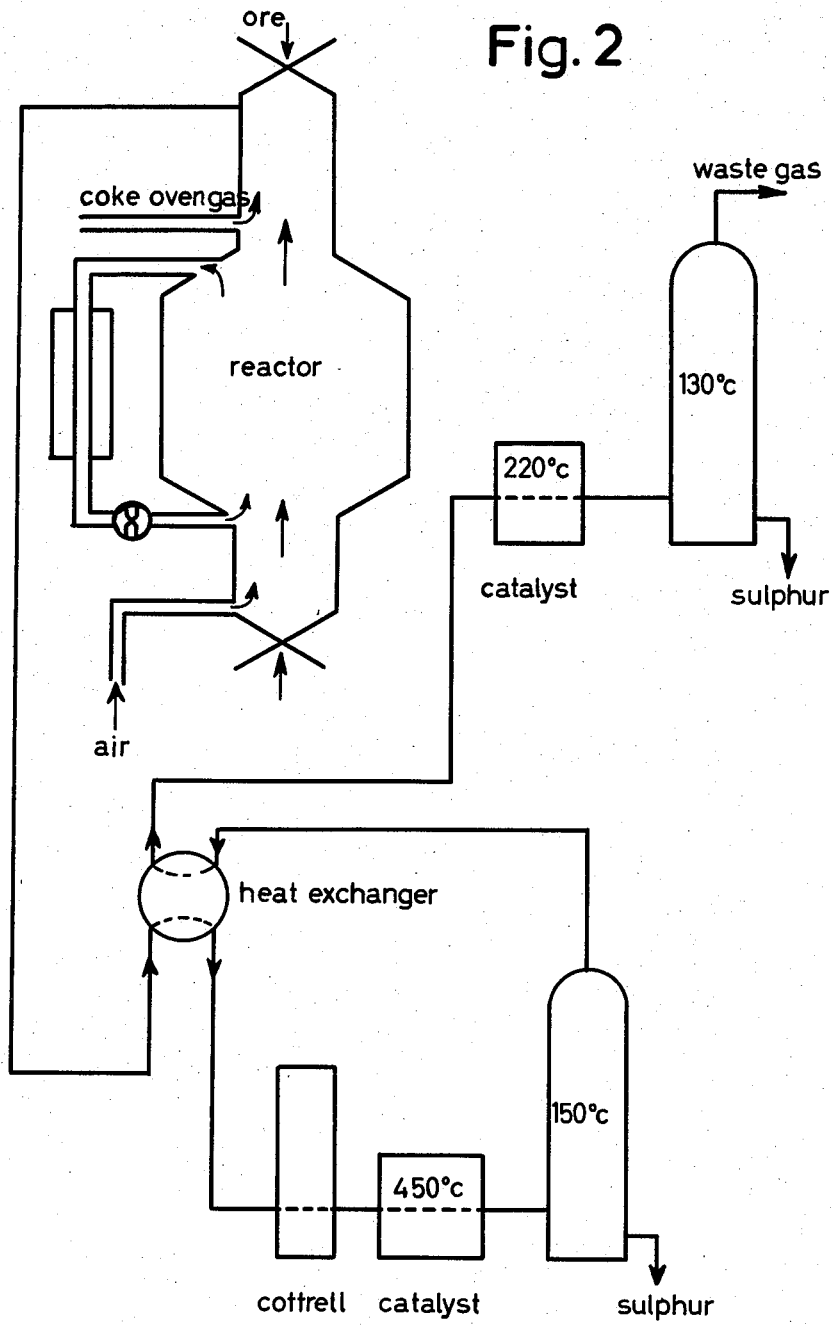

2,869,999

PROCESS FOR THE PRODUCTION OF SULPHUR, METAL OXIDES AND METAL SULPHATES

Terkel Rosenqvist, Trondheim, Norway

Application February 25, 1957, Serial No. 642,280

Claims priority, application Norway March 7, 1956

4 Claims. (Cl. 75—6)

Roasting of sulphide ore, containing minerals such as pyrite and pyrrhotite, by means of air to produce sulphur dioxide and roasted ore is a well known operation, which is commonly used in the chemical-metallurgical industry. The roast-gas is mainly used for production of sulphuric acid in the sulphuric acid industry, and for production of digesting liquor in cellulose works.

The roasted ore consists mainly of iron oxide with a small remainder of sulphide and of gangue which was present in the raw material, and also frequently contains minor amounts of other constituents, such as copper, nickel, cobalt, zinc, silver and gold, in the form of sulphides, sulphates or oxides.

In most cases the roasted ore is not given a further treatment at the sulphuric acid or cellulose factories, but is sold to other works or refineries where the values are extracted. For the production of sulphur dioxide and sulphuric acid, it is often more convenient to use elemental sulphur as the raw material. By this procedure a more simple technical arrangement may be used, and problems is disposal of roasted ore are avoided. In the U. S. A., where the supply of native sulphur is abundant, this is the usual procedure. Approximately 80% of all sulphur dioxide and sulphuric acid is there produced fom native sulphur, and only approximately 15% from sulphide ores (including recovery from waste gases).

In Europe it has for a long time been a task for pyrite producers to convert sulphide ores into elemental sulphur and iron oxide. The full utilization of the non-ferrous metals contained in the ore is a simultaneous object. Technically such a benefication can very well be accomplished. It is for example possible to roast the ore, and afterwards reduce the sulphur dioxide formed by means of a reducing agent, such as coke, carbon monoxide, producer gas, natural gas etc. However, the cost of the usual reducing agents is at the present time considerable, and therefore it is difficult to arrive at an economical method based on these principles.

It has been known for a long time that elemental sulphur can be produced from pyrite by distilling off the "labile" sulphur atom, if air is excluded:

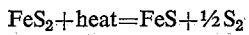

In order to produce the necessary heat, the iron sulphide was frequently burned:

A modern embodiment of this principle is described in Norwegian Patent No. 82,054. In practice only 35–40% of the sulphur content is obtained in the form of elemental sulphur. The rest is obtained in the form of sulphur dioxide, which either has to be used directly, or can be converted to elemental sulphur by means of a reducing agent.

In a prior Norwegian patent (No. 36,173) there is described a process for production of sulphur from sulphide ores without melting. On the top of a shaft furnace a charge consisting of sulphide ore (pyrite) and carbonaceous material (coke) constituted the feed. At the bottom of the furnace air was introduced in an amount sufficient to oxidize iron sulphide to iron oxide and sulphur dioxide. The heat of reaction was supposed to be utilized for distilling off the "labile" sulphur in the layers of feed situated at higher levels. Simultaneously the content of coke should be sufficient to reduce sulphur dioxide to elemental sulphur. However, it was not possible to develop this method on a technical scale, because the charge sintered or melted, due to the great amount of heat which was liberated in the reaction.

In the process according to the present invention, iron sulphide is roasted with air without sintering or melting. Part of the reaction heat is utilized for heating purposes and for "pyrite distillation" in the layers of charge at higher levels. A greater part of the reaction heat, however, is removed from the reaction furnace at or above the zone of roasting, by conducting a great part of the gas through a cooler (or steam boiler), and afterwards returning it to the reaction furnace at a place below that zone by means of a fan. In that way sintering or melting of the charge is avoided, and the heat liberated in the process can be utilized at convenience. The circulating gas consists mainly of nitrogen and sulphur dioxide.

To obtain a successful result of the process, it is important to control the temperature at different places in the furnace very carefully. In the continuous treatment of a charge of constant composition, it is sufficient to control the amount of and the temperature of the circulating gas.

By altering the speed of the fan, and thus the amount of circulation gas, and by regulating the temperature of entering circulation gas by appropriate cooling, it is possible to treat sulphide ores of different compositions. The invention, therefore, represents a very flexible process, which can be used for production of desired products from a number of different raw materials.

To reduce sulphur dioxide, which is formed in the roasting of iron sulphide, to elemental sulphur, it is possible to use a charge consisting of pyrite and coke, as already proposed in the Norwegian Patent No. 36,173 mentioned above.

However, it is more convenient to use a gaseous reducing agent. Particularly well suited for the purpose is a gas rich in carbon monoxide, such as gas from an electric pig iron furnace. Producer gas, blast furnace gas, or coke oven gas may also be used.

As well known coke oven gas always contains a considerable amount of methane. At temperatures between 500° and 1000° C. methane is not stable, and may be decomposed with separation of carbon, which eventually may cause discolouring of the sulphur obtained in the process. In order to avoid separation of carbon, the gas may be treated with carbon dioxide or with water vapour before entering the furnace. However, experience has proved that discolouring of sulphur by the separation of carbon is completely avoided by leading the gas directly to the reaction furnace at a place above the roasting zone.

By this procedure it is also possible to utilize the reaction heat from the reaction between reducing gas and sulphur dioxide, for distilling off the pyritic sulphur atom. The "distillation" is, as being well known, strongly endothermic (approx. 80 kcal. per mol of sulphur liberated). In spite of the great quantity of heat evolved by the roasting of iron sulphide, the amount of which theoretically being in excess of that needed for pyrite distillation, it is very difficult to transfer this heat to the layers above without local overheating, causing sintering or even melting of the charge. Therefore it is an essential feature of the present invention that only a minor part of the heat of roasting is utilized for the "distillation," while the greater part is provided by the reaction between reducing gas and sulphur dioxide. In this manner it is possible to establish stable heat conditions throughout the reaction furnace, and the temperature everywhere in the furnace may be regulated at will. If necessary, the amount of heat for "distillation" may be increased by preheating of the reducing gas.

After the reactions in the furnace having taken place the still hot gases are conducted through a dust chamber or a Cottrell filter and then to a device for catalytic after-treatment. At 450–500° C. the following catalyzed reaction takes place:

$$4COS + 2SO_2 = 4CO_2 + 3S_2$$

The gas mixture is then passed through a condenser, where the elemental sulphur is condensed out, and the remaining gases are passed further to another catalytic unit, which is kept at a temperature of 215–235° C., where the reaction $$2H_2S + SO_2 = 2H_2O + 3S$$

takes place. The reaction products are passed through a condenser where the elemental sulphur is condensed and collected, and the remaining gases are passed to waste.

In passing through the reaction furnace the nonferrous metals are at least partly transferred into sulphates.

The process can be carried out in two different ways, dependent on whether an optimal sulphatization of the nonferrous metals is desired or not.

In case an optimum sulphatization of the nonferrous metals is desired, the maximum temperature in the roasting zone should not be too high, preferably not above 850° C. Entering the furnace, the circulation gas should have a temperature suitable for the sulphatization, that is between 500 and 600° C. The temperature difference of circulation gas leaving and entering the furnace is in this case limited to approximately 300° C.

If it is of minor importance to convert the nonferrous metals into water-soluble compounds, the temperature in the roasting zone may be higher but not above approximately 950° C., if sintering shall be avoided. The circulation gas should be cooled as far as possible before entering the furnace. The temperature difference may, therefore, in this case amount to more than 500° C.

It will be understood that if an optimum sulphatization is desired, a relatively large amount of nitrogen+sulphur dioxide-mixture has to be circulated through the cooler. In this case, it is usually necessary to preheat the reducing gas before entering the furnace.

In the treatment of flotation concentrates or other fine-grained material, the charge may be transferred into briquettes before treatment in the furnace. If a shaft furnace is used, such preparation is necessary.

If the nonferrous metals are to be transferred into water-soluble compounds, minor amounts of such salts should be added to the briquettes, that have a catalytic effect on the sulphatization. Among such salts, magnesium chloride, calcium chloride, magnesium sulphate, sodium sulphate etc. may be mentioned; added either separately or as mixtures thereof, the amount being 1–5% by weight of the ore.

After cooling, the roasted ore may be treated in different ways, dependent on in which manner the roasting has been carried out.

If an optimum sulphatization has been the aim, the roasted ore may be leached in the ordinary way with water or diluted acid. The nonferrous metals are afterwards precipitated from the dilute solutions.

If the sulphatization is incomplete, a chloridizing salt may be added to the roasted ore, and the chlorides of the nonferrous metals can be driven off by heating.

Example

In the following a description is given of the treatment of sulphide ore which contains (per ton):

| | | |
|---|---|---|
| $FeS_2$ | kmoles | 5.15 |
| $FeS_{1.1}$ | kmoles | 1.90 |
| $CuFeS_2$ | kmoles | 0.35 |
| $ZnS$ | kmoles | 0.07 |
| $Fe_3O_4$ | kmoles | 0.17 |
| Gangue | kg | 80 |
| Water | kg | 20 |

The process is carried out in a shaft furnace, as diagrammatically illustrated in Fig. 1 of the drawing.

The process may also be carried out in a fluidized bed reactor with several beds.

As reducing agent is used coke oven gas, containing 12% CO, 57% $H_2$ and 27% $CH_4$.

In the reactor the zones mentioned below and reckoned from top to bottom may be considered to exist, although in practice the zones will overlap to some extent.

(1) *Preheating.—20–650° C.*—The ore is preheated to approximately 650° C. in counter-current with the rising gas. In this gas some after-reactions take place, inter alia:

(I) $\qquad 4COS + 2SO_2 = 4CO_2 + 3S_2$ (2) *Pyrite decomposition.—650–800° C.*—Here the pyrite is decomposed to $FeS_{1.1}$, and at the same time the main reaction between sulphur dioxide and reducing gas takes place. The reducing coke oven gas is introduced at the bottom of this zone.

The following reactions take place.

(II) $\quad 5.15\ FeS_2 = 5.15\ FeS_{1.1} + 2.32\ S_2$
(III) $\ 0.35\ CuFeS_2 = 0.175\ Cu_2S + 0.35\ FeS_{1.1} + 0.1\ S_2$
(IV) $\ 0.17\ Fe_3O_4 + 0.46\ S_2 = 0.52\ FeS_{1.1} + 0.35\ SO_2$
(V) $\quad 6.2\ SO_2 + 10.1\ red.gas =$
$\qquad\qquad 0.3S_2 + 5.6H_2S + 4CO_2 + 5.7H_2O$ (3) *Roasting.—800–850° C.*—In this zone $FeS_{1.1}$ is oxidized, mainly to $Fe_3O_4$ and $SO_2$. From the roasting zone a substantial part of gas is removed and cooled, and the cooled gas is returned to the zone (4) below.

In this circulation gas the ratio of sulphur dioxide to nitrogen is 1:6.7 (volume parts).

The following reaction takes place:

(VI) $\quad 7.9\ FeS_{1.1} + 14O_2 = 2.65\ Fe_3O_4 + 8.7\ SO_2$ (4) *Sulphatization.—600–500° C.*—Here copper and zinc are converted to sulphates, and $Fe_3O_4$ is oxidized to $Fe_2O_3$. The following reactions take place:

(VII) $\quad 2.65\ Fe_3O_4 + 0.66\ O_2 = 3.96\ Fe_2O_3$
(VIII) $\ 0.175\ Cu_2S + 0.52\ O_2 + 0.175\ SO_2 = 0.35\ CuSO_4$
(IX) $\qquad 0.07\ ZnS + 0.14\ O_2 = 0.07\ ZnSO_4$ (5) *Cooling.—500–60° C.*—Here the solid material is cooled in counter-current with incoming cold air.

In the example described the amount of circulation gas is approximately 4.5 times that of air entering at the furnace bottom.

The yield of elemental sulphur was about 90%. The yield of copper also was about 90%, but varied with the pretreatment of the ore.

Figure 2 diagrammatically shows how the gas leaving the top of the reactor is worked up to yield elemental sulphur.

I claim:

1. A process of treating heavy metal sulphide ores to produce sulphur, metal oxides and metal sulphates, comprising introducing the ore into the upper portion of a treating zone for downward movement through the same, roasting the ore with air at an intermediate region in the zone, distilling off pyritic sulphur from the ore at a region above the roasting region, and introducing a reducing gas directly into the treating zone at a region between the roasting and distillation regions to reduce the sulphur dioxide formed by roasting the ore and to utilize the heat of reaction in the reduction of the sulphur dioxide to distill off the sulphur formed in the reduction.

2. A process according to claim 1, further comprising removing a part of the gases resulting from the roasting at a place between the roasting and the distillation regions, cooling said gas, and thereafter returning at least the greater part of said cooled gas to the treating zone at a place below the roasting region.

3. A process according to claim 2 in which the part of gases resulting from the roasting is withdrawn from the treating zone at a place below the place where the reducing gas is introduced.

4. A process according to claim 1 in which the reducing gas is a gas containing carbon monoxide and selected from the group consisting of coke oven gas, producer gas, and blast furnace gas.

References Cited in the file of this patent

UNITED STATES PATENTS

| | | |
|---|---|---|
| 1,001,536 | Lilja | Aug. 22, 1911 |
| 1,593,509 | Smaill | July 20, 1926 |
| 2,693,409 | Stephens, Jr. | Nov. 2, 1954 |
| 2,733,137 | Swaine et al. | Jan. 31, 1956 |

FOREIGN PATENTS

| | | |
|---|---|---|
| 731,527 | Great Britain | June 8, 1955 |